(12) United States Patent
Wei et al.

(10) Patent No.: US 11,966,405 B1
(45) Date of Patent: Apr. 23, 2024

(54) INFERRING BRAND SIMILARITIES USING GRAPH NEURAL NETWORKS AND SELECTION PREDICTION

(71) Applicant: Amazon Technologies, Inc., Seattle, WA (US)

(72) Inventors: Chaoran Wei, New York, NY (US); Shaunak Mishra, Jersey City, NJ (US); Anirban Sengupta, Sammamish, WA (US); Ravendar Lal, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/064,591

(22) Filed: Dec. 12, 2022

(51) Int. Cl.
*G06F 16/2457* (2019.01)
*G06N 3/045* (2023.01)

(52) U.S. Cl.
CPC ....... *G06F 16/24578* (2019.01); *G06N 3/045* (2023.01)

(58) Field of Classification Search
CPC .... G06N 20/00; G06N 3/045; G06Q 30/0601; G06Q 30/0631; G06F 16/9024; G06F 16/24578; G06F 16/248; G06F 16/9538; G06F 18/22; G06F 16/3347; G06F 16/532
See application file for complete search history.

(56) References Cited

U.S. PATENT DOCUMENTS 10,606,907 B1 * 3/2020 Peddinti ................ G06F 16/248

* cited by examiner

*Primary Examiner* — Hau H Hoang
(74) *Attorney, Agent, or Firm* — Perilla Knox & Hildebrandt LLP; Thomas B. Hildebrandt

(57) ABSTRACT

Disclosed are various embodiments for inferring brand similarities using graph neural networks and selection prediction. In one embodiment, a brand-to-brand graph is generated indicating similarities between a set of brands according to at least one of: click-through data or conversion data. Using a first graph neural network (GNN) tower, the brand-to-brand graph is analyzed to determine brand similarities among a first brand identified from a search query and a first set of other brands. Using a second GNN tower, the brand-to-brand graph is analyzed to determine brand similarities among a second brand and a second set of other brands. A level of similarity between the first brand and the second brand is determined based at least in part on an output of the first GNN tower and an output of the second GNN tower.

20 Claims, 7 Drawing Sheets

INFERRING BRAND SIMILARITIES USING GRAPH NEURAL NETWORKS AND SELECTION PREDICTION

BACKGROUND

Understanding what brands are similar to a particular brand can be helpful in electronic commerce systems. For example, brand similarity can enable brand discovery by showing sponsored items from brands similar to a particular brand identified in a search query. Users tend to explore alternative brands when top search results do not meet their intent. However, determining brand similarity is a highly subjective inquiry.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying brand similarities using graph neural networks and selection prediction. Similarity of brands can be gauged in terms of user behavior towards a pair of brands in the same context, as well as in terms of the item characteristics like attributes, prices, descriptions, and images. As an example, consider Shoe Brand X and Shoe Brand Y, which are two brands offering similar products (e.g., running shoes), and may be associated with similar shopper behaviors. In contrast, Shoe Brand X and Electronics Brand Z offer very different products, and user behavior towards them in the same search context can be very different. As another example, consider a search query for luxury watches, and the brands Watch Brand A and Watch Brand B. Suppose that Watch Brand A corresponds to a well-known Swiss luxury watchmaker, but in contrast Watch Brand B is a well-known consumer electronics company which also happens to have a watch product line. In this case, the comparison is not clear. Leveraging user behavior signals in such contexts, e.g., determining if users engage with both Watch Brand A and Watch Brand B when they are searching luxury watches, can provide some intuitive guidance.

One approach for determining brand similarity may rely upon a manual curation of similarity data. In other words, an editor may manually annotate a particular brand as being similar to a set of other brands. However, such manual annotation may be costly and assumes that the editor has familiarity with customer perception of the brands involved, which may not be the case. Other approaches for determining brand similarity may involve unsupervised approaches aimed at learning the similarity in user behavior towards a pair of brands. However, existing unsupervised approaches for brand similarity inference have provided unsatisfactory results, particularly for new brands or brands that have limited user selection data.

Various embodiments of the present disclosure introduce the use of graph neural networks to infer the brand-to-brand relations using the form of a graph. The graph neural network approaches lead to predictive features for a selection prediction model, as will be described. In some embodiments, a combination of a multi-tower deep neural network and node2vec, an algorithmic framework for representational learning on graphs, can be used. In some embodiments, a graph convolutional network can be used. A graph convolutional network is a type of graph neural network which applies convolution operations to graphs. The convolution operations summarize original graph structures into ones with lower dimensions or embeddings. The approaches provide improved brand similarity identification, particularly in cold-start scenarios where empirical user selection data is unavailable or is unavailable in a sufficient quantity.

Figure 1:
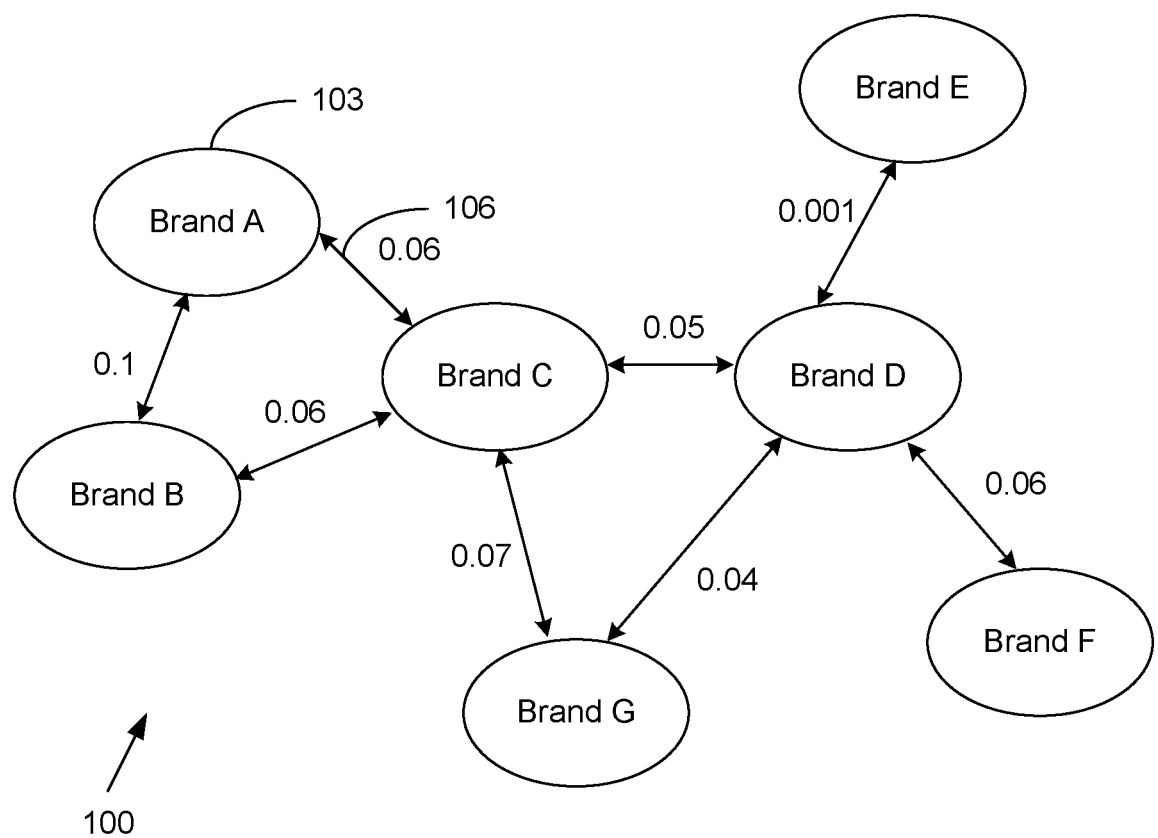
FIG. 1 is a drawing of one example of a graph according to various embodiments of the present disclosure

Turning now to FIG. 1, shown is a drawing of one example of a graph 100 according to various embodiments of the present disclosure. The graph 100 corresponds to a collection of nodes 103 and edges 106. The nodes 103 represent individual brands, while an edge 106 connecting two nodes 103 represents a probability that a user searching for a first brand will click on or otherwise select an item from a second brand. The edges 106 in the graph 100 are depicted as having bidirectionality. In other examples, the edges 106 may have different probability values based upon the direction. For example, the probability that a user searching for a first brand will click on items from a second brand may differ from the probability that a user searching for a second brand will click on items from a first brand.

In the example of FIG. 1, Brand A and Brand B are considered highly similar, as they are adjacent nodes 103 with a relatively high probability value of 0.1. By contrast, Brand D and Brand E are considered not very similar, as they are adjacent nodes 103 with a relatively low probability value of 0.001. Brand F is much more similar to Brand D, with a 0.06 probability value. Likewise, Brand C is somewhat similar to Brand D, with a 0.05 probability value. Using a graph neural network approach as described herein, $n^{th}$ degree brand relations can be explored. For example, the relationship between Brand F and Brand C can be explored, through their mutual relationships with Brand D.

As one skilled in the art will appreciate in light of this disclosure, certain embodiments may be capable of achieving certain advantages, including some or all of the following: (1) improving the functioning of computer systems by improving the automated identification of brand similarities in scenarios where limited data is available; (2) improving the flexibility of computer systems by avoiding manual curation of data to provide brand similarity annotations; (3) improving the functioning of computer systems by leveraging graph convolutional networks to identify brand similarities; and so forth. In the following discussion, a general description of the system and its components is provided, followed by a discussion of the operation of the same.

Figure 2:
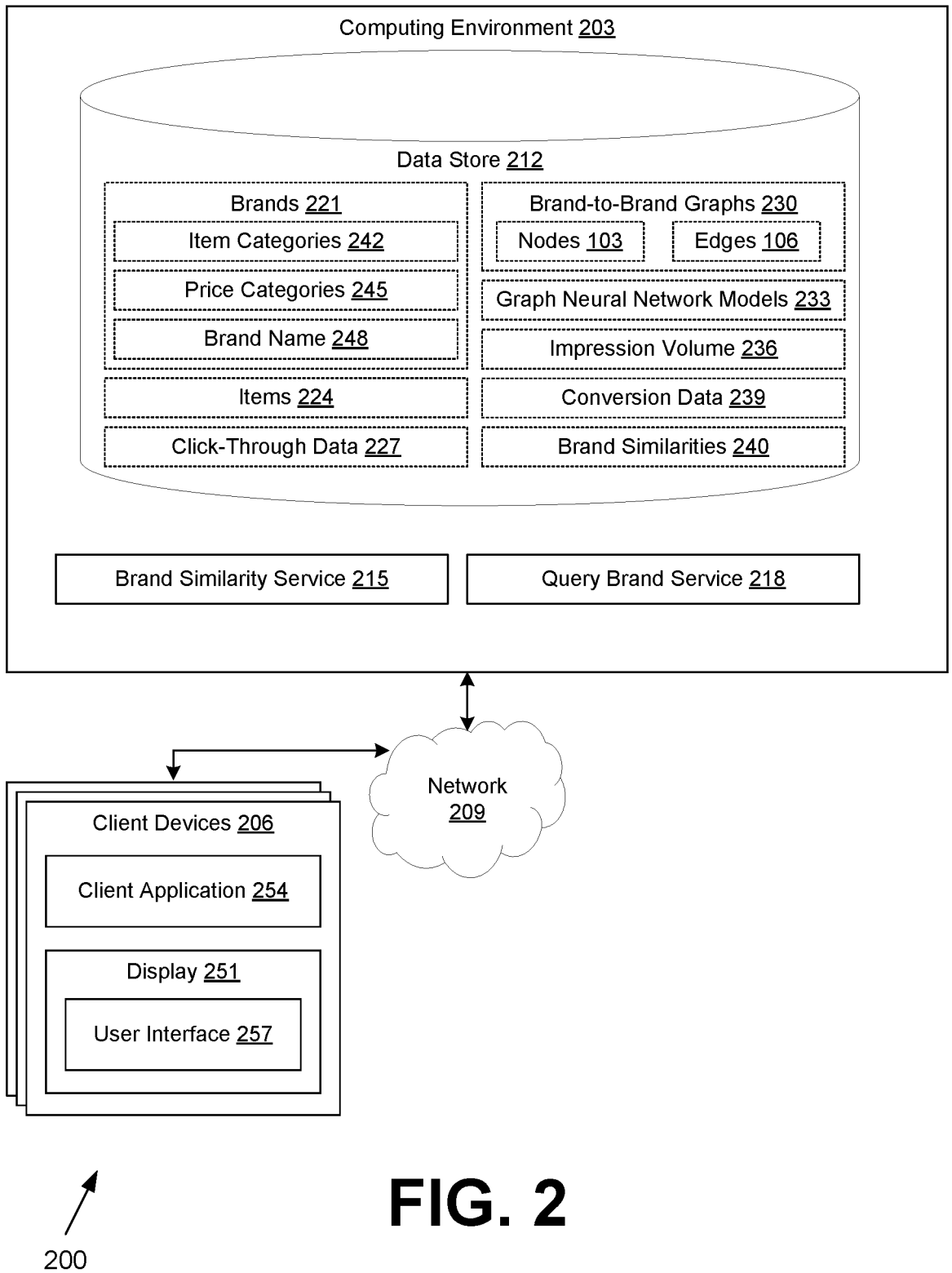
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a brand similarity service 215, a query brand service 218, and other applications, services, processes, systems, engines, or functionality not discussed in detail herein. The brand similarity service 215 is executed to determine, given a query brand, one or more other brands that are similar to the query brand. In one embodiment, the brand similarity service 215 may generate a level of similarity for each of a plurality of different brands, which then may be ranked from highest similarity to lowest similarity. In some embodiments, the brand similarity service 215 may return a list of items to be included in a web page or other user interface that corresponds to a search results interface generated in response to a search query. For example, a search results page may include a widget that displays items from similar brands but would not otherwise be included in the search results that match the search query, or would not otherwise be included above-the-fold or in the initial top results of the search results page. In this way, users may discover items from different brands that are similar to the brand for which they are searching.

The query brand service 218 is executed to determine a query brand from a search query. In some cases, a user may search for a particular brand name in one or more keywords. For example, the user may submit a search query of "Brand X" or "Brand X shoes." In such cases, the query brand service 218 may easily determine the query brand as it is included as one or more of the keywords in the search query. In other cases, the user may enter a search query that does not explicitly specify a brand name. In one example, the user may enter a search query for an item name without the brand name, and the item name may be a trademark or other unique item name associated with the brand name. In such cases, the query brand service 218 can easily determine the brand name as being associated with the trademarked item name.

In another example, the query brand service 218 may infer a brand name from a search query that does not include a brand name or a unique item name. For example, if the user searches for "Swiss luxury watches," the query brand service 218 may identify a particular brand name that is associated with the search query at least by a threshold confidence score. The query brand service 218 may determine such associations, for example, by examining click-through data or conversion data to determine a brand associated with items that are most often selected or ordered by users after the users perform the search query.

The data stored in the data store 212 includes, for example, one or more brands 221, one or more items 224, click-through data 227, one or more brand-to-brand graphs 230, one or more graph neural network models 233, an impression volume 236, conversion data 239, brand similarities 240, and potentially other data. The brands 221 may correspond to sources of items 224 such that there is an association between the item 224 and the brand 221 as a unique source. In various examples, a brand 221 may correspond to a manufacturer, distributor, supplier, retailer, advertiser, or other source entity of the item 224. A source entity, however, may be associated with a number of different brands 221. In some cases, a source entity may offer similar items 224 under different brands 221, where there is perceived differentiation among the different brands 221.

A brand 221 may be associated with one or more item categories 242, one or more price categories 245, one or more brand names 248, and/or other data. The item categories 242 correspond to categories of items 224 that are offered under the brand 221. For example, item categories 242 may correspond to watches, shoes, books, electronics, and so on. It is noted that a given item 224 may fall into a taxonomy of item categories 242, ranges from less specific to more specific. For example, a particular sandal may be classified as footwear, a sandal, or a casual sandal, which moves from less specific to more specific. In some embodiments, brands 221 that do not offer items 224 in overlapping or at least complementary item categories 224 may be excluded from consideration as being similar.

The price categories 245 may be used to classify the price ranges of items 224 offered under the brand 221. Based upon price generally, a brand 221 may be classified in the price category 245 of being a value brand when the items 224 offered under the brand 221 are generally considered to have a relatively low price. By contrast, a brand 221 may be classified in the price category 245 of being a luxury brand when the items 224 offered under the brand 221 are generally considered to have a relatively high price. In some embodiments, brands 221 that do not offer items 224 in overlapping or adjacent price categories 245 may be excluded from consideration as being similar. In one example, a value brand may not be considered similar to a luxury brand, and vice versa, as users who order value brands of a type of item 224 may be unlikely to order a luxury brand of the type of item 224. In another example, a mid-priced brand may be considered similar to a value brand, and vice versa, as users may order from brands 221 in adjacent price categories 245.

The brand name 248 may correspond to one or more trademarks, service marks, or other names that uniquely identify a brand 221. In some cases, the brand name 248 may be different from the name of the manufacturer or other source entity. Also, a brand name 248 may have multiple variations, such as an abbreviation or short form, as compared to a long form. The brand name 248 may also have formal and informal variations. In some cases, the brand name 248 for the same brand 221 may be different in different languages or in different regions. For example, a brand 221 may sell the same product under one brand name 248 in one region of a country but under a different name in another region of the country.

The items 224 may be offered for order via an electronic commerce system. For example, the items 224 may comprise products, goods, services, digital downloads, digital content, and/or other items 224. As discussed, each item 224 may be associated with one or more brands 221. In some cases, an item 224 may be unassociated with a brand 221.

The click-through data 227 represents which items 224 are clicked upon or otherwise selected by users when the items 224 are shown in a user interface in response to a search query. As the items 224 may be associated with brands 221, the click-through data 227 may be used to determine which brands 221 are clicked upon or selected when a search query is performed for another brand 221. The conversion data 239 represents which items 224 are ordered by users when the items 224 are shown in a user interface in response to a search query. As the items 224 may be associated with brands 221, the conversion data 239 may be used to determine which brands 221 are ordered when a search query is performed for another brand 221. Both the click-through data 227 and the conversion data 239 represent user selections that may be used in various embodiments for inferring brand similarities 240.

The brand-to-brand graphs 230 are graphs 100 generated from click-through data 227 and/or conversion data 239 that represent how similar brands 221 are to one another based upon a probability that one brand 221 is selected (e.g., click-through or order) in response to a different query brand 221. The brand-to-brand graphs 230 may comprise nodes 103 corresponding to brands 221, and edges 106 connecting the nodes 103 that represent a probability of selection. In determining whether one brand 221 is similar to another brand 221, a brand-to-brand graph 230 may be processed separately by respective towers of the graph neural network models 233, and then a determination of similarity may be made through a combination of the analyzed and data reduced brand-to-brand graphs 230. The graph neural network models 233 may correspond, for example, to graph convolutional network (GCN) models, node2vec models, deep neural network models, multilayer perceptron (MLP), and other models.

The impression volume 236 may correspond to a number of views or impressions that a particular brand 221 has in an electronic commerce system. The embodiments described herein may offer particularly improved performance in cold start scenarios in which the weekly impression volume 236 is below, for example, 2000 impressions per week. Other approaches (e.g., using collaborative filtering to directly calculate that a user who searches for Brand A selects Brand B) may offer similar performance when the weekly impression volume 236 exceeds, for example, 2000 impressions per week. This is because the embodiments described herein are able to leverage $n^{th}$ degree relationships between brands 221 more effectively. In other words, the embodiments described herein may use brand-to-brand-to-brand relationships as developed from the brand-to-brand graphs 230 to augment understanding similarities when brand-to-brand data is insufficient or lacking.

The brand similarities 240 are generated by the brand similarity service 215 using the brand-to-brand graphs 230 generated by the graph neural network models 233. For example, the brand similarities 240 for a given brand 221 may be ranked in order of strength or level of similarity. In some cases, similar brands 221 may be excluded from the brand similarities 240 based upon the brands 221 not participating in an advertising program or based upon what the brands 221 are willing to pay for participation in the advertising program.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 251. The display 251 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 254 and/or other applications. The client application 254 may be executed in a client device 206, for example, to access network content served up by the computing environment 203 and/or other servers, thereby rendering a user interface 257 on the display 251. To this end, the client application 254 may comprise, for example, a browser, a dedicated application, etc., and the user interface 257 may comprise a network page, an application screen, etc. The client device 206 may be configured to execute applications beyond the client application 254 such as, for example, email applications, social networking applications, word processors, spreadsheets, and/or other applications.

Next, a general description of the operation of the various components of the networked environment 200 is provided. To begin, the brand similarity prediction task can be formulated as a supervised click prediction problem within the context of an electronic commerce system (e.g., search pages, detail pages, checkout pages, etc.) The click probability (target variable) to be estimated is the following:

$$P(\text{click Reference}_{brand_i} | \text{Query}_{brand_j}, i \neq j,$$
$$PT(\text{Query}_{brand_j}) = PT(\text{Reference}_{brand_i})) \qquad \text{(Equation 1)}$$

Where $P(\bullet|\bullet)$ denotes conditional probability, $\text{Query}_{brand_j}$ is the search query on the search page alluding to $\text{brand}_j$, $\text{Reference}_{brand_i}$ is the item 224 associated with brand s that appears on the search results page, and $PT(\bullet)$=denotes the item category 242. The target variable therefore could be stated in plain words as: probability of selecting an item 221 from $\text{brand}_i$, given a search query for brand, where $\text{brand}_i$ and $\text{brand}_j$ are distinct brands 221, and the query item category 221 is equal to the item category 221 of the reference items 224. In this formulation, inequality between query brand 221 and reference brand 221 is enforced because the brand similarity 240 is to be computed. Item category 221 equality may be enforced to remove potential complementary recommendation effects. For example, if users search for a cellphone with "Brand X" brand 221 mentioned in their query and prefer to click on the phone cases from "Brand Y," this does not mean that the two brands 221 are similar, and the co-click behavior here is because a phone case complements a cellphone. The objective of the estimation task (framed as binary classification) is to minimize the log-loss l stated as follows:

$$l = -\sum_{t=1}^{N} \left[ y_t \log(\hat{p}_t) + (1-y_t)\log(1-\hat{p}_t) \right]$$ (Equation 2)

where $\hat{p}_t$ is the estimated click probability for impression t which has label 1 ($y_t$=1) if the impression resulted in a click ($y_t$=0, otherwise). Each impression event involves a query brand 221 and a reference brand 221, and the estimated $\hat{p}_t$ is same across all impressions where the variables in Equation 1 are the same. Further, the losses across such impressions can be aggregated, and the loss computation can be made more efficient.

In order to learn brand-to-brand click behavior, the inherent features of a brand 221 and the historically observed interactions between brands 221 may be considered. The inherent features of a brand 221 can be used to predict if a user would like to click on it. Examples of such features include average brand price considered in the price categories 245 and average brand rating. Machine learning systems can be used to extract the inherent features from click-through data 227 and conversion data 239. Another type of feature involves brand to brand relations. Examples of these features are historically observed brand-to-brand click-through rate (CTR) on a search page and a detail page. These features can directly guide a model towards predicting how users interact among brands 221.

The historical brand to brand CTR on the search page can be a dominant feature which by itself yields high performance while predicting the target variable. However, this holds true only for brand pairs that have enough historical impressions and clicks. The challenge arises when there are not enough past interactions between brands 122. This is the cold start problem in the brand similarity prediction task. In this scenario, other features such as inherent brand properties may become more important (as the otherwise dominant historical CTR feature is not available in such cases). Learning brand similarity for cold start brand pairs is important to encourage brand discovery. All relevant brand interactions may not be present in the training time window used to compute the otherwise dominant historical CTR feature due to biases in the current ranking models in production, presence of emerging brands 121, seasonality, and other factors.

Figure 3A:
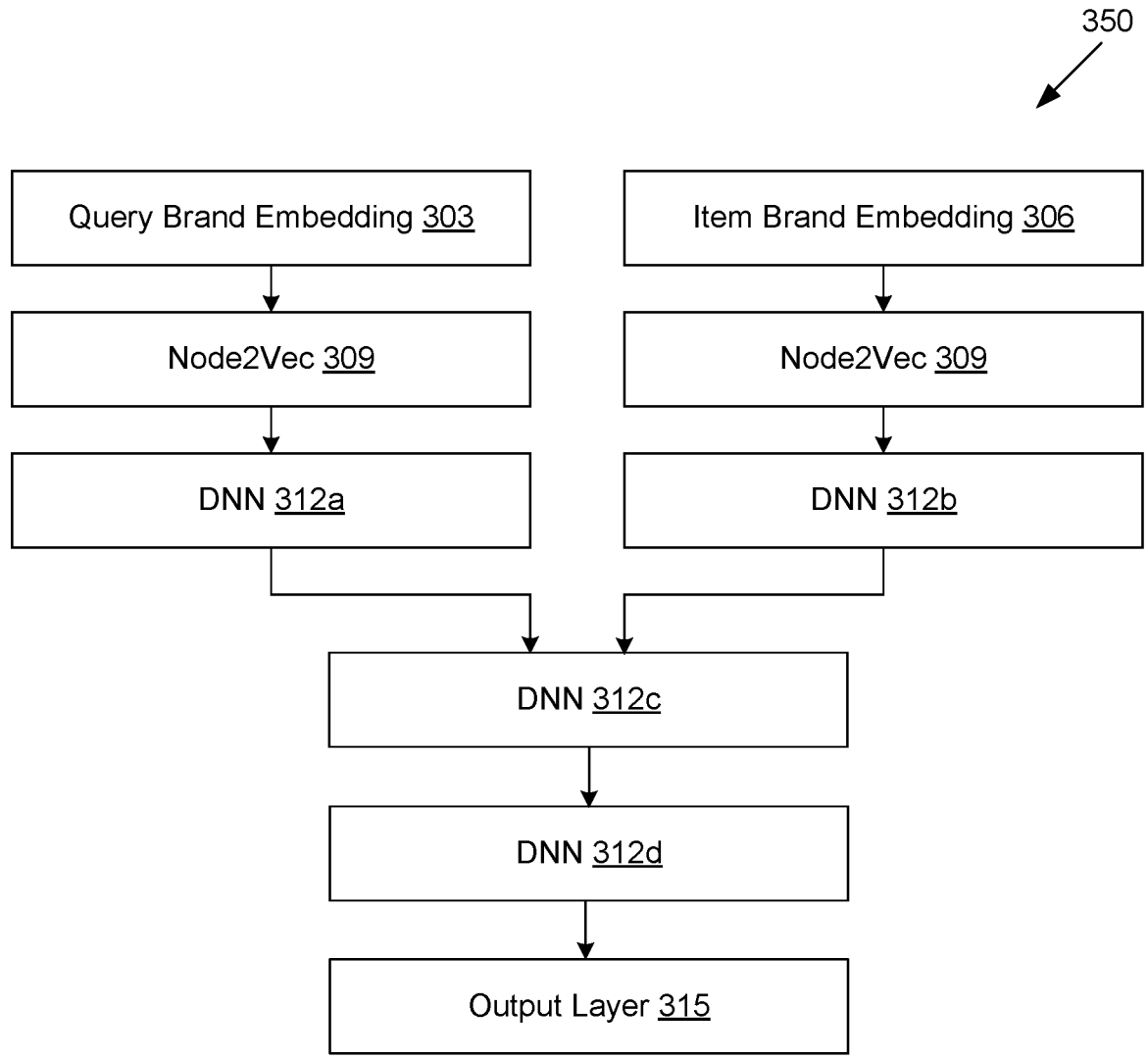
FIGS. 3A and 3B are drawings of example architectures for a brand similarity service according to various embodiments of the present disclosure.

Referring next to FIG. 3A, shown is an example architecture 300 for a brand similarity service 215 based upon using node2vec and a deep neural network (DNN) model. The architecture 300 includes computing query brand embedding 303 and item brand embedding 306, fine-tuning brand embeddings using node2vec 309, a two-tower structure on top of the brand embeddings (DNN 312a and 312b), and a concatenation layer to add other features from brands 221 (e.g., average price) and brand-to-brand interactions (e.g., historical CTR) (DNN 312c), followed by a final feed forward network (DNN 312d) leading to the sigmoid output layer 315. The details around these components are described below.

Embedding vectors are learned through multiple sources contextual information including item 124 titles and description. In one implementation, the embedding vectors are 256 dimensional. To obtain the embedding for a brand 122, the corresponding item level embeddings may be averaged. Such brand embeddings are used to initialize the node 103 (brand 221) embedding in a node2vec configuration, where the brand-to-brand graph 230 comprises nodes 103 (brands 221), and the edge 106 weights are historically observed brand to brand CTR Equation 1. The node2vec algorithm may be used to get node 103 (brand 221) embeddings from the brand-to-brand graph 230. In other words, node2vec may be used to fine-tune the brand embeddings generated from an inherent feature analysis. Node2vec essentially performs a random walk on the brand-to-brand graph 230 to generate a sequence, and then applies the word2vec algorithm to learn the representation of the nodes 103.

After obtaining the fine-tuned brand embeddings, a two-tower neural network may be employed to process the query brand and the item brand embedding (query and reference brands as outlined in Equation 1). This part is initialized via Xavier uniform initialization, and the goal is to project these embeddings to lower dimensions before concatenating additional features (inherent brand features and historical brand-to-brand interaction features). After such concatenation, a feed forward network leads to the output (sigmoid) layer.

Figure 3B:
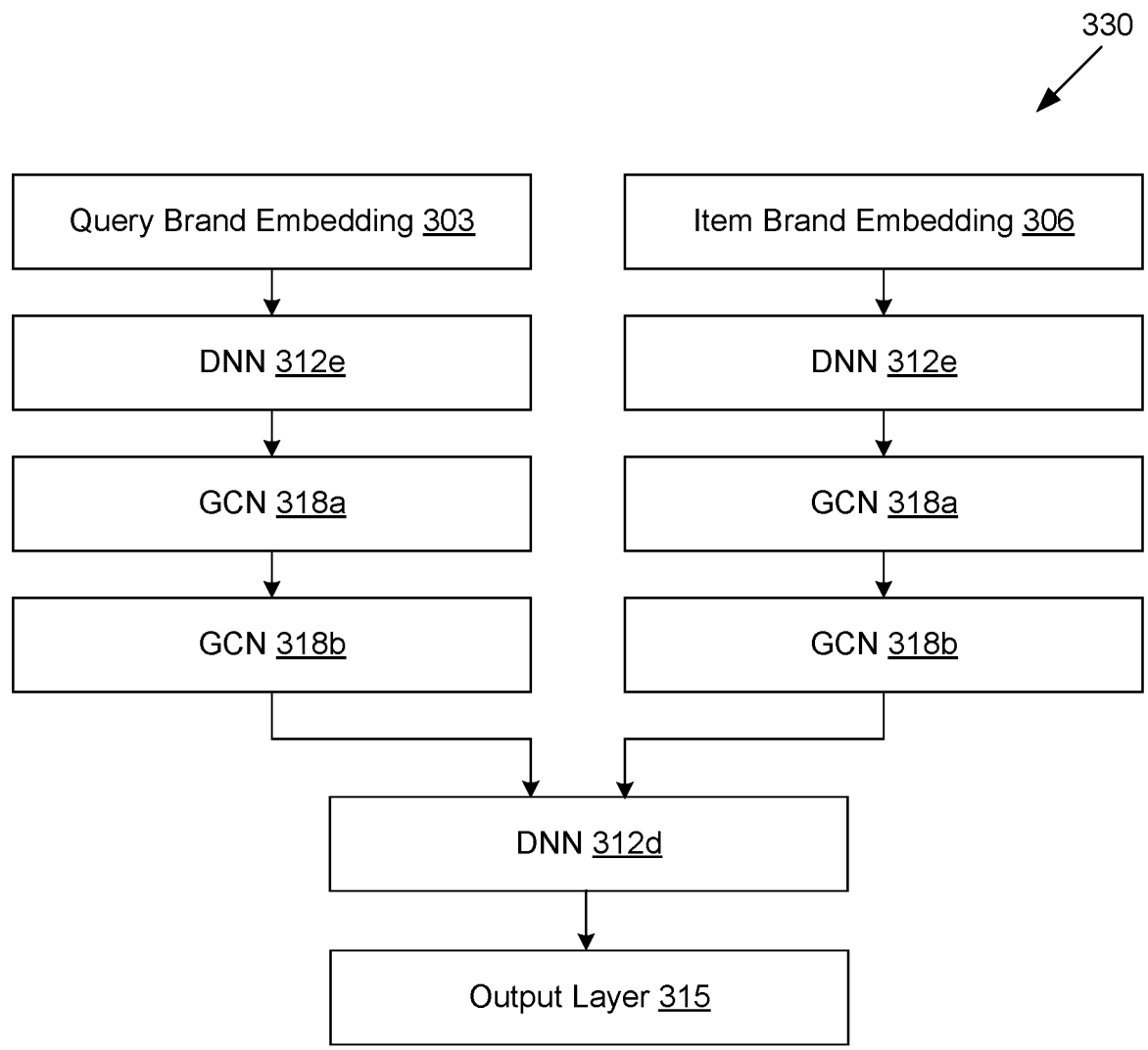

Moving on to FIG. 3B, shown is an example architecture 330 for a brand similarity service 215 based upon using a two-tower graph convolutional network (GCN) model. Analogous to a convolutional neural network (CNN), where a convolutional layer learns the interaction among adjacent pixels in images, GCN implements a convolutional layer in each tower (GCN 318a, 318b) which learns the interactions among nodes 103 in a brand-to-brand graph 230 as follows:

$$H^{(l+1)} = \sigma\left(\tilde{D}^{-\frac{1}{2}} \tilde{A} \tilde{D}^{-\frac{1}{2}} H^{(l)} W^{(l)}\right)$$ (Equation 3)

Where $\tilde{A} = A + I^N$ is the adjacency matrix of the brand-to-brand graph 230 with added self-connections, $I^N$ is the identity matrix, $D_{ii} = \Sigma_j A_{ij}$, and $W^{(l)}$ is a layer-specific trainable weight matrix. σ denotes an activation function. H(l) is the hidden convolutional layer. An advantage of GCN is that the model is able to learn the interactions between brand i and brand j, given not only direct interactions between brand i and brand j, but also the indirect interaction between brand j and brand k, as well as brand i and brand k:

$$\tilde{I}(i,j) = W_1 I(i,j) W_2 I(j,k) + w_3 I(i,k)$$ (Equation 4)

In this case, $\tilde{I}(i, j)$ is the final interaction learned by the model for brand i and brand j, which is the weighted average of the direct interactions among all three brands i, j, and k. The weights correspond to $W^{(l)}$ in the GCN equation. The difference between $\tilde{I}(i, j)$ and the direct interaction I(i, j) accounts for at least a portion of the performance difference between neural architecture without graph-based methods and the architecture 330.

Figure 4:
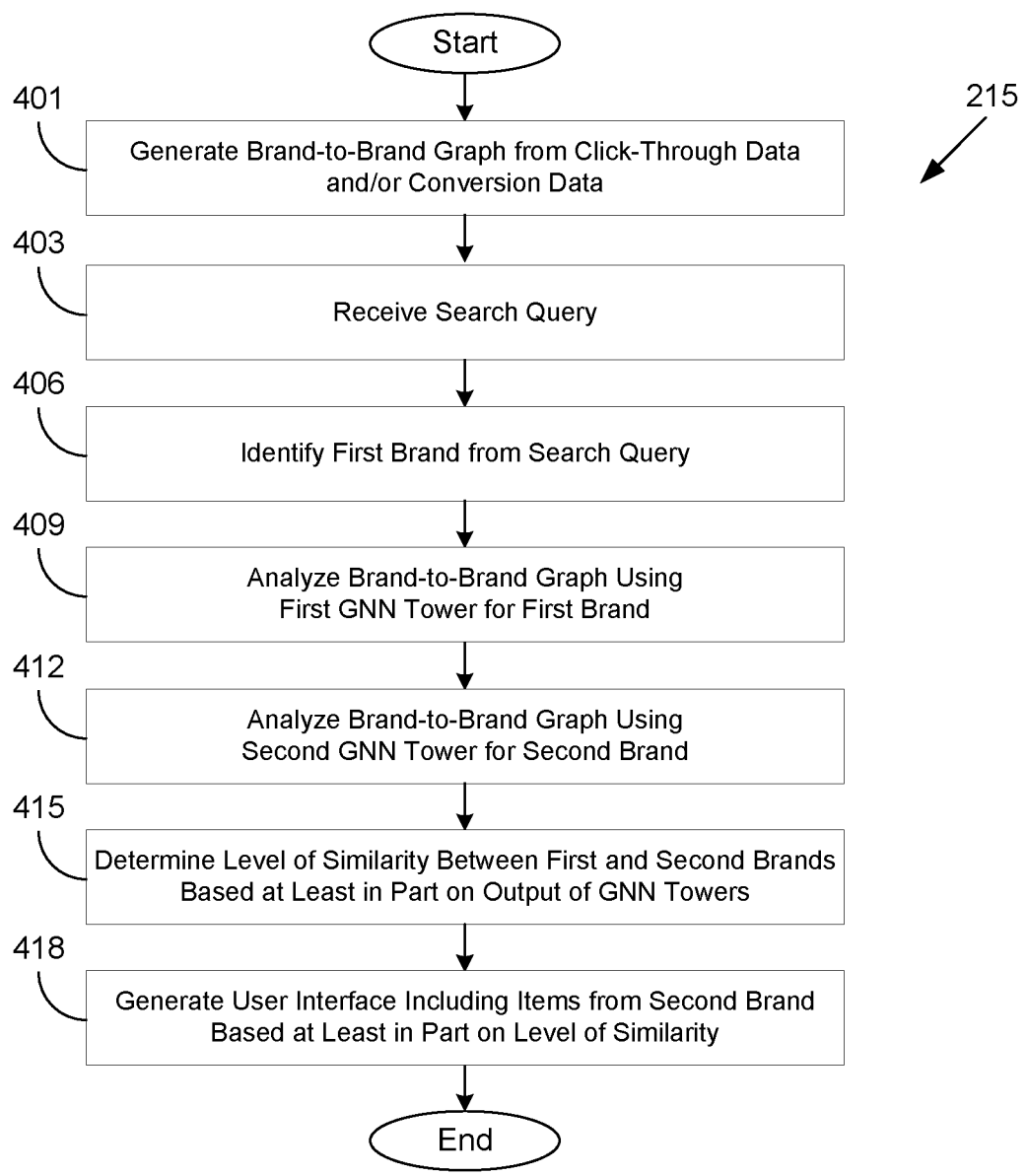
FIGS. 4 and 5 are flowcharts illustrating examples of functionality implemented as portions of a brand similarity service executed in a computing environment in the networked environment of FIG. 2 according to various embodiments of the present disclosure.

Referring next to FIG. 4, shown is a flowchart that provides one example of the operation of a portion of the brand similarity service 215 according to various embodiments. It is understood that the flowchart of FIG. 4 provides merely an example of the many different types of functional arrangements that may be employed to implement the operation of the portion of the brand similarity service 215 as described herein. As an alternative, the flowchart of FIG. 4 may be viewed as depicting an example of elements of a method implemented in the computing environment 203 (FIG. 2) according to one or more embodiments.

Beginning with box 401, the brand similarity service 215 generates a brand-to-brand graph 230 for a set of brands 221 based at least in part on click-through data 227 and/or conversion data 239. In some cases, the brand-to-brand graph 230 may be generated by a machine learning model.

In box 403, the brand similarity service 215 receives a search query entered by a user via a client application 254 over the network 209. For example, the user may enter the search query into a text input box of a form on a user interface 257. The search query may include one or more keywords, which may either include a brand 221 or not include a brand 221.

In box 406, the brand similarity service 215 identifies a first brand 221 from the search query using the query brand service 218. The query brand service 218 may identify a brand 221 from a brand name 248 explicitly included in one or more keywords of the search query, or the query brand service 218 may indirectly infer a brand 221 based upon an association between the search query and the brand 221.

In box 409, the brand similarity service 215 analyzes the brand-to-brand graph 230 using a first tower of a graph neural network model 233, such as a GCN or a DNN, for the first brand 221. In some scenarios, the brand similarity service 215 may determine initial brand similarities 240 for the first brand 221 using a node2vec algorithm, which are then refined by the graph neural network model 233. The brand-to-brand graph 230 corresponds to a brand similarity graph indicating connections between the first brand 221 and a set of other brands 221. In the brand-to-brand graph 230, the edges 106 represent a respective probability of a selection of a given brand 221 associated with a first node 103 following search queries associated with the first brand 221 associated with a second node 103.

In box 412, the brand similarity service 215 analyzes the brand-to-brand graph 230 using a second tower of a graph neural network model 233, such as a GCN or a DNN, for a second brand 221, such as a reference brand 221 or item brand 221. The brand-to-brand graph 230 is a brand similarity graph indicating connections between the second brand 221 and a set of other brands. For example, in the brand-to-brand graph 230, the edges 106 represent a respective probability of a selection of a given brand 221 associated with a first node 103 following search queries associated with the second brand 221 associated with a second node 103. In some scenarios, the brand similarity service 215 may determine initial brand similarities 240 for the second brand 221 using a node2vec algorithm, which are then refined by the graph neural network model 233. In some embodiments, either the first tower or the second tower may be precomputed for efficiency, while the other tower is dynamically computed in response to the search query to speed up real time inferencing.

In box 415, the brand similarity service 215 determines a level of similarity between the first brand 221 and the second brand 221 based at least in part on the outputs of the first and second towers of the graph neural network model 233. The outputs summarize the original graph structures into ones with lower dimensions or embeddings. For example, a concatenation layer may be employed to merge the two results and infer the brand-to-brand similarity between the first brand 221 and the second brand 221. Further, brands 221 may be excluded from being considered similar based upon a mismatch of the item categories 242 or the price categories 245. For example, the level of similarity between the first brand 221 and the second brand 221 may be determined further based at least in part on determining that the first brand 221 and the second brand 221 include items 224 associated with a particular price category 245 or a particular item category 242. In some cases, the brand similarity service 215 may generate a ranking of respective levels of similarity between the first brand 221 and a plurality of second brands 221.

In box 418, the brand similarity service 215 generates a user interface 257 that includes items 224 from the second brand 221, and/or a recommendation for such items 224, based at least in part on the level of similarity between the first brand 221 and the second brand 221. In one embodiment, the items 224 may be included based at least in part on the level of similarity exceeding a threshold, or based at least in part on the second brand 221 having a highest level of similarity to the first brand 221. For example, the user interface 257 may correspond to a search result page showing results for the search query. It is noted that in some situations the items 224 for the second brand 221 would not match the search query or otherwise be included within search results. In other examples, the user interface 257 may correspond to an item detail page for an item 224 of the first brand 221, a checkout page where an item 224 of the first brand 221 is being ordered, and so forth. Subsequently, if a user clicks on or orders one of the items 224 presented in the user interface 257, the selection will go back into updating the click-through data 227 and/or the conversion data 239, which can be used to further refine the brand similarities 240. Thereafter, the operation of the portion of the brand similarity service 215 ends.

Figure 5:
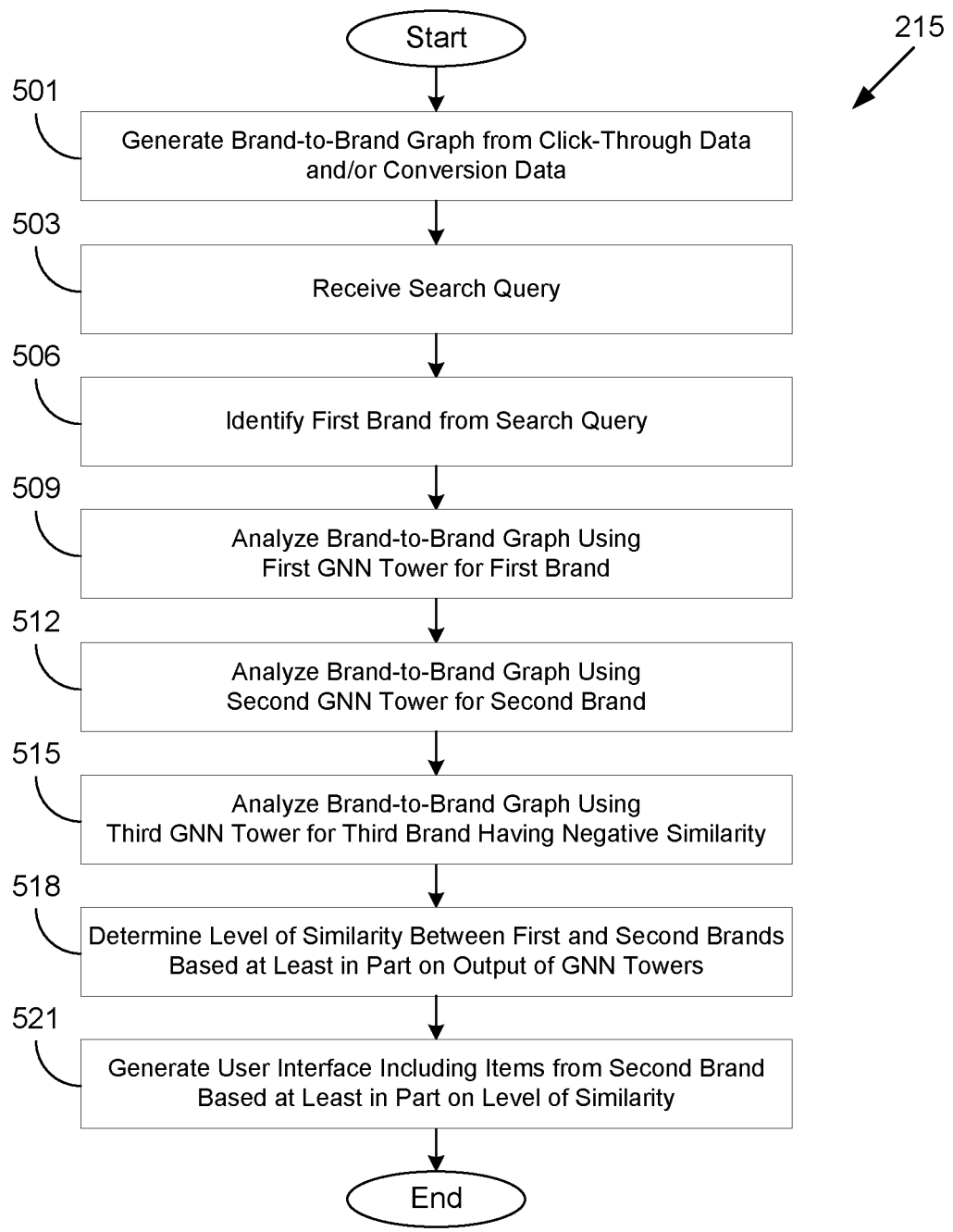

Referring next to FIG. 5, shown is a flowchart that provides one example of the operation of a portion of the brand similarity service 215 according to various embodiments. It is understood that the flowchart of FIG. 5 provides merely an example of the many different types of functional arrangements that may be employed to implement the operation of the portion of the brand similarity service 215 as described herein. As an alternative, the flowchart of FIG. 5 may be viewed as depicting an example of elements of a method implemented in the computing environment 203 (FIG. 2) according to one or more embodiments.

Beginning with box 501, the brand similarity service 215 generates a brand-to-brand graph 230 for a set of brands 221 based at least in part on click-through data 227 and/or conversion data 239. In some cases, the brand-to-brand graph 230 may be generated by a machine learning model.

In box 503, the brand similarity service 215 receives a search query entered by a user via a client application 254 over the network 209. For example, the user may enter the search query into a text input box of a form on a user interface 257. The search query may include one or more keywords, which may either include a brand 221 or not include a brand 221.

In box 506, the brand similarity service 215 identifies a first brand 221 from the search query using the query brand service 218. The query brand service 218 may identify a brand 221 from a brand name 248 explicitly included in one or more keywords of the search query, or the query brand service 218 may indirectly infer a brand 221 based upon an association between the search query and the brand 221.

In box 509, the brand similarity service 215 analyzes the brand-to-brand graph 230 using a first tower of a graph neural network model 233, such as a GCN or a DNN, for the first brand 221. In some scenarios, the brand similarity service 215 may determine initial brand similarities 240 for the first brand 221 using a node2vec algorithm, which are then refined by the graph neural network model 233. The brand-to-brand graph 230 corresponds to a brand similarity graph indicating connections between the first brand 221 and a set of other brands 221. In the brand-to-brand graph 230, the edges 106 represent a respective probability of a selection of a given brand 221 associated with a first node 103 following search queries associated with the first brand 221 associated with a second node 103.

In box 512, the brand similarity service 215 analyzes the brand-to-brand graph 230 using a second tower of a graph neural network model 233, such as a GCN or a DNN, for a second brand 221, such as a reference brand 221 or item brand 221. The brand-to-brand graph 230 is a brand similarity graph indicating connections between the second brand 221 and a set of other brands. For example, in the brand-to-brand graph 230, the edges 106 represent a respective probability of a selection of a given brand 221 associated with a first node 103 following search queries associated with the second brand 221 associated with a second node 103. In some scenarios, the brand similarity service 215 may determine initial brand similarities 240 for the second brand 221 using a node2vec algorithm, which are then refined by the graph neural network model 233. In some embodiments, either the first tower or the second tower may be precomputed for efficiency, while the other tower is dynamically computed in response to the search query to speed up real time inferencing.

In box 515, the brand similarity service 215 analyzes the brand-to-brand graph 230 using a third tower of a graph neural network model 233, such as a GCN or a DNN, for a third brand 221, such as a reference brand 221 or item brand 221, that has a negative similarity to the first brand 221. For example, the third brand 221 may be known to be dissimilar to the first brand 221, so brands 221 that are similar to the third brand 221 may also be dissimilar to the first brand 221. The brand-to-brand graph 230 is a brand similarity graph indicating connections between the third brand 221 and a set of other brands. In the brand-to-brand graph 230, the edges 106 represent a respective probability of a selection of a given brand 221 associated with a first node 103 following search queries associated with the third brand 221 associated with a second node 103. In some scenarios, the brand similarity service 215 may determine initial brand similarities 240 for the third brand 221 using a node2vec algorithm, which are then refined by the graph neural network model 233. In some embodiments, the second tower and/or the third tower may be precomputed for efficiency, while the first tower is dynamically computed in response to the search query to speed up real time inferencing.

In box 518, the brand similarity service 215 determines a level of similarity between the first brand 221 and the second brand 221 based at least in part on the outputs from the first GNN tower, the second GNN tower, and the third GNN tower. For example, a concatenation layer may be employed to merge the three results and infer the brand-to-brand similarity between the first brand 221 and the second brand 221, also based upon dissimilarity with the third brand 221. Further, brands 221 may be excluded from being considered similar based upon a mismatch of the item categories 242 or the price categories 245. For example, the level of similarity between the first brand 221 and the second brand 221 may be determined further based at least in part on determining that the first brand 221 and the second brand 221 include items 224 associated with a particular price category 245 or a particular item category 242. In some cases, the brand similarity service 215 may generate a ranking of respective levels of similarity between the first brand 221 and a plurality of second brands 221.

In box 521, the brand similarity service 215 generates a user interface 257 that includes items 224 from the second brand 221, and/or a recommendation for such items 224, based at least in part on the level of similarity between the first brand 221 and the second brand 221. In one embodiment, the items 224 may be included based at least in part on the level of similarity exceeding a threshold, or based at least in part on the second brand 221 having a highest level of similarity to the first brand 221. For example, the user interface 257 may correspond to a search result page showing results for the search query. It is noted that in some situations the items 224 for the second brand 221 would not match the search query or otherwise be included within search results. In other examples, the user interface 257 may correspond to an item detail page for an item 224 of the first brand 221, a checkout page where an item 224 of the first brand 221 is being ordered, and so forth. Subsequently, if a user clicks on or orders one of the items 224 presented in the user interface 257, the selection will go back into updating the click-through data 227 and/or the conversion data 239, which can be used to further refine the brand similarities 240. Thereafter, the operation of the portion of the brand similarity service 215 ends.

Figure 6:
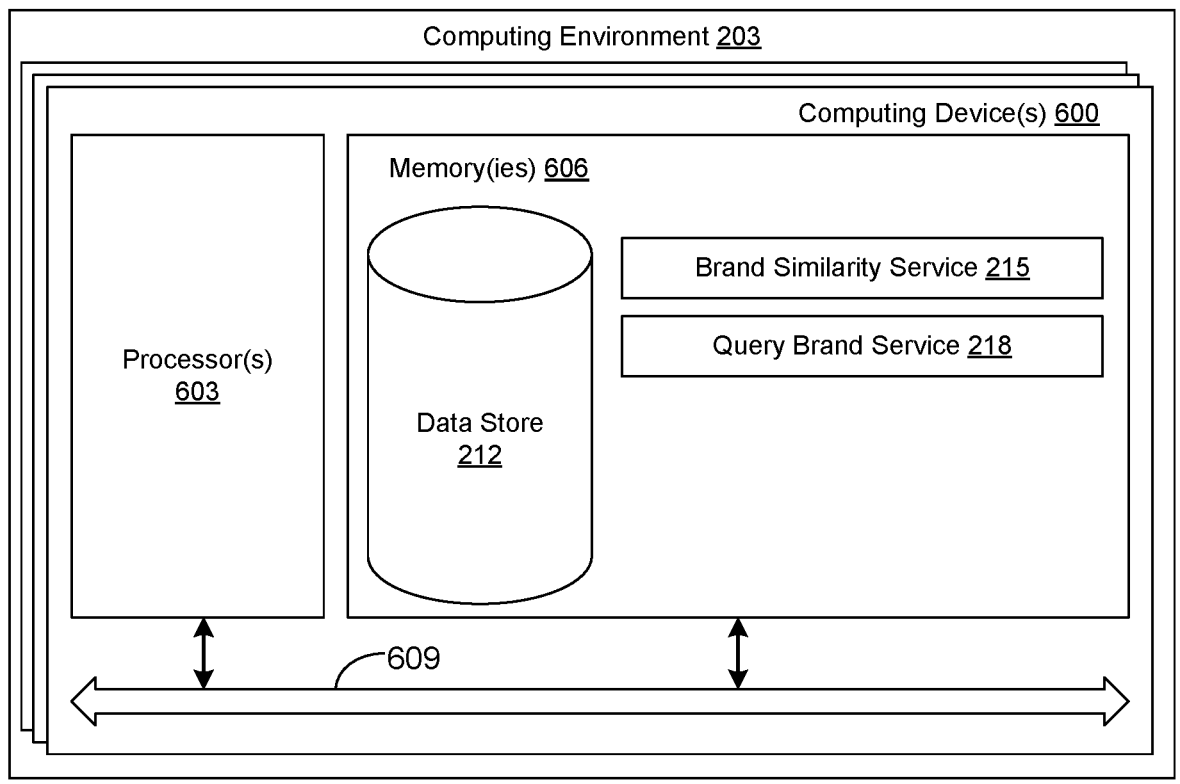
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the brand similarity service 215, the query brand service 218, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages. In various examples, APACHE SPARK or TORCH may be used for data analytics.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the brand similarity service 215, the query brand service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the brand similarity service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the brand similarity service 215 and the query brand service 218, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the brand similarity service 215 and the query brand service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   generate a brand-to-brand graph indicating similarities between a set of brands according to click-through data, wherein edges of the brand-to-brand graph represent a respective probability of a click-through to an item detail page associated with an item of a given brand associated with a first node following search queries associated with another brand associated with a second node;
   receive a search query;
   identify a first brand based at least in part on the search query;
   analyze, using a first graph convolutional network (GCN) tower, the brand-to-brand graph to determine brand similarities among the first brand and a first set of other brands;
   analyze, using a second GCN tower, the brand-to-brand graph to determine brand similarities among a second brand and a second set of other brands;
   determine a level of similarity between the first brand and the second brand based at least in part on an output of the first GCN tower and an output of the second GCN tower; and
   generate a user interface in response to the search query, wherein the user interface includes one or more items from the second brand that do not match the search query based at least in part on the level of similarity.

2. The non-transitory computer-readable medium of claim 1, wherein determining the level of similarity between the first brand and the second brand is further based at least in part on determining that the first brand and the second brand include items associated with a particular item category or a particular price category.

3. The non-transitory computer-readable medium of claim 1, wherein when executed the program further causes the at least one computing device to at least:
   analyze, using a third GCN tower, the brand-to-brand graph to determine brand similarities among a third brand excluded from results following the search query and a third set of other brands; and
   wherein the level of similarity is determined further based at least in part on an output of the third GCN tower.

4. A computer-implemented method, comprising:
   generating a brand-to-brand graph indicating similarities between a set of brands according to at least one of: click-through data or conversion data, wherein edges of the brand-to-brand graph represent a respective probability of a selection of a given brand associated with a first node following search queries associated with another brand associated with a second node;
   analyzing, using a first graph neural network (GNN) tower, the brand-to-brand graph to determine brand similarities among a first brand identified from a search query and a first set of other brands;
   analyzing, using a second GNN tower, the brand-to-brand graph to determine brand similarities among a second brand and a second set of other brands; and
   determining a level of similarity between the first brand and the second brand based at least in part on an output of the first GNN tower and an output of the second GNN tower.

5. The computer-implemented method of claim 4, wherein the first GNN tower corresponds to a first graph convolutional network (GCN) tower, and the second GNN tower corresponds to a second GCN tower.

6. The computer-implemented method of claim 4, further comprising:
   analyzing, using a third GNN tower, the brand-to-brand graph to determine brand similarities among a third brand excluded from results following the search query and a third set of other brands; and
   wherein the level of similarity is determined further based at least in part on an output of the third GNN tower.

7. The computer-implemented method of claim 4, further comprising:
   determining initial brand similarities for the first brand and initial brand similarities for the second brand using a node2vec algorithm; and
   wherein the first GNN tower corresponds to a first deep neural network (DNN) tower, and the second GNN tower corresponds to a second DNN tower.

8. The computer-implemented method of claim 4, wherein the selection corresponds to a click-through to an item detail page associated with an item of the second brand.

9. The computer-implemented method of claim 4, wherein the selection corresponds to an order of an item of the second brand.

10. The computer-implemented method of claim 4, wherein determining the level of similarity between the first brand and the second brand is further based at least in part on determining that the first brand and the second brand include items associated with a particular price category.

11. The computer-implemented method of claim 4, wherein determining the level of similarity between the first brand and the second brand is further based at least in part on determining that the first brand and the second brand include items associated with a particular item category.

12. The computer-implemented method of claim 4, further comprising generating a ranking of respective levels of similarity between the first brand and individual ones of a plurality of second brands.

13. The computer-implemented method of claim 4, further comprising identifying the first brand as being one or more keywords in the search query.

14. The computer-implemented method of claim 4, further comprising identifying the first brand as being associated with one or more keywords in the search query, the first brand being excluded from the search query.

15. The computer-implemented method of claim 4, further comprising generating a user interface in response to receiving another search query for the first brand, wherein the user interface includes a recommendation for one or more items from the second brand based at least in part on the level of similarity determined between the first brand and the second brand.

16. A system, comprising:
  at least one computing device; and
  instructions executable in the at least one computing device, wherein when executed the instructions cause the at least one computing device to at least:
    generate a brand-to-brand graph indicating similarities between a set of brands according to at least one of: click-through data or conversion data, wherein edges of the brand-to-brand graph represent a respective probability of a selection of a given brand associated with a first node following search queries associated with another brand associated with a second node;
    analyze, using a first graph neural network (GNN) tower, the brand-to-brand graph to determine brand similarities among a first brand identified from a search query and a first set of other brands;
    analyze, using a second GNN tower, the brand-to-brand graph to determine brand similarities among a second brand and a second set of other brands; and
    determine whether to include one or more items from the second brand in a user interface generated in response to the search query based at least in part on an output of the first GNN tower and an output of the second GNN tower.

17. The system of claim 16, wherein determining whether to include the one or more items from the second brand in the user interface is further based at least in part on determining that the first brand and the second brand include items associated with a particular price category and a particular item category.

18. The system of claim 16, wherein the first brand is identified as being one or more keywords in the search query.

19. The system of claim 16, wherein the first GNN tower corresponds to a first graph convolutional network (GCN) tower, and the second GNN tower corresponds to a second GCN tower.

20. The system of claim 16, wherein the instructions further cause the at least one computing device to at least:
  analyze, using a third GNN tower, the brand-to-brand graph to determine brand similarities among a third brand excluded from results following the search query and a third set of other brands; and
  wherein determining whether to include the one or more items from the second brand in the user interface is further based at least in part on an output of the third GNN tower.

* * * * *